Oct. 29, 1963 D. H. PRUDEN ETAL 3,109,128
SERVO-MECHANISM CONTROL CIRCUIT
Filed Sept. 19, 1960 4 Sheets-Sheet 1

INVENTORS D. H. PRUDEN
J. W. TIMKO
BY
Walter M. Hill
ATTORNEY

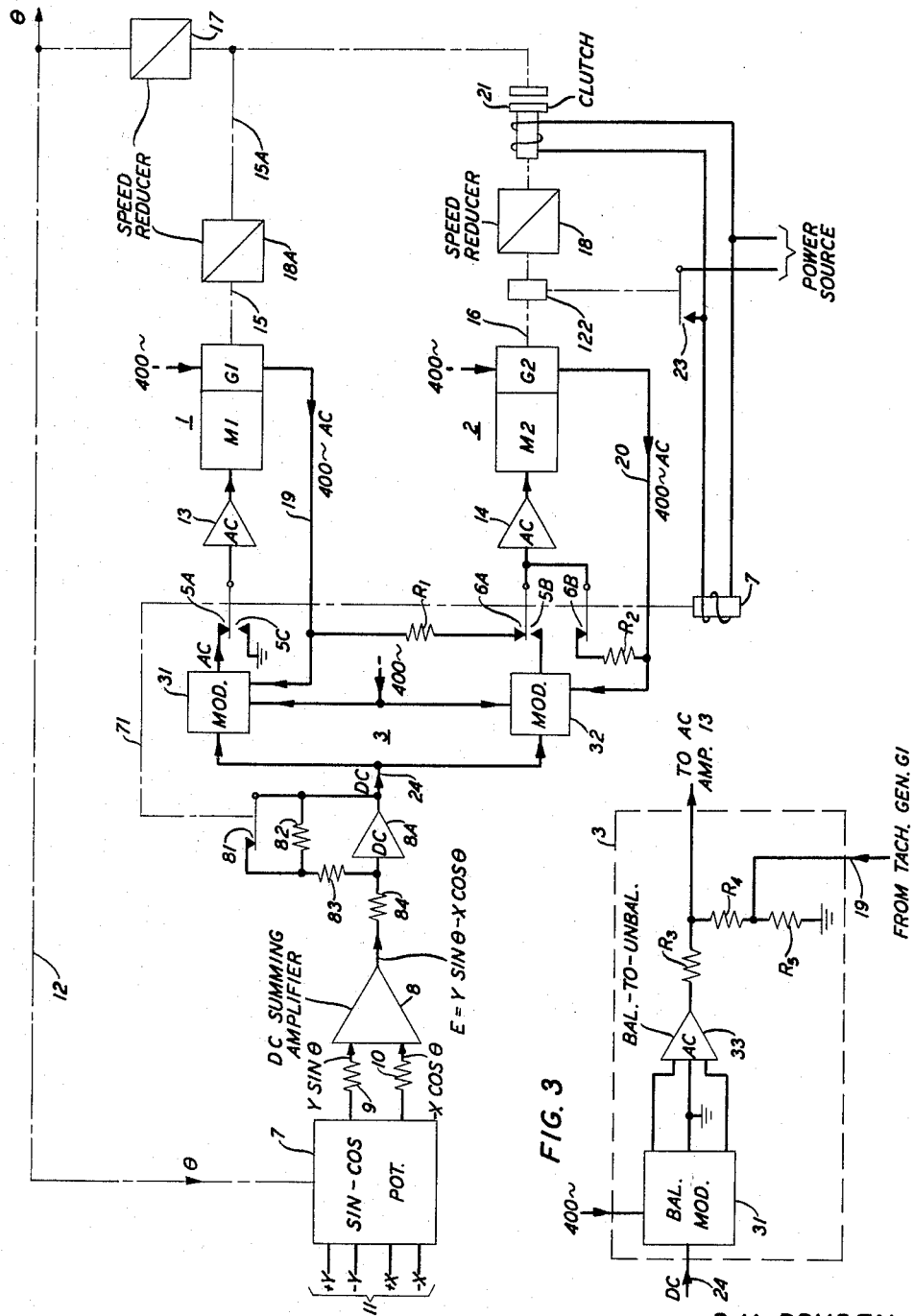

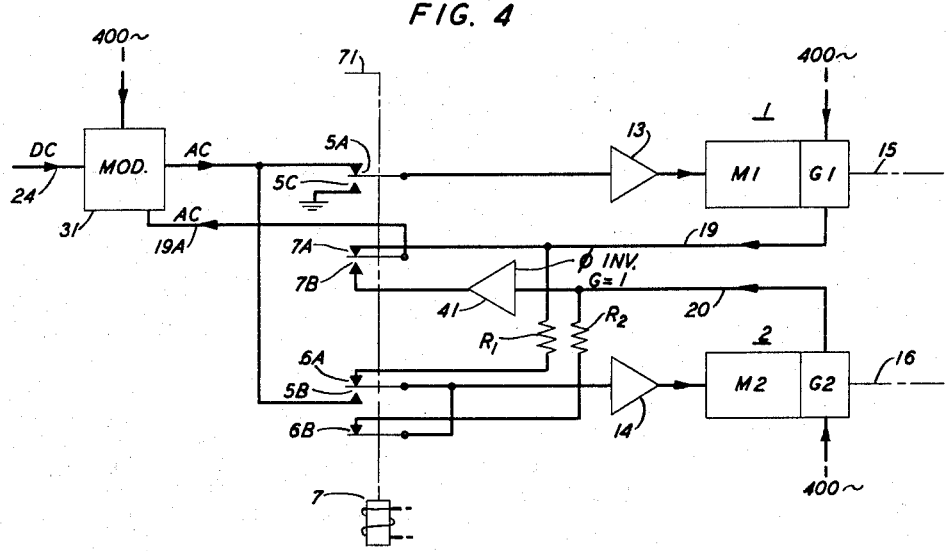
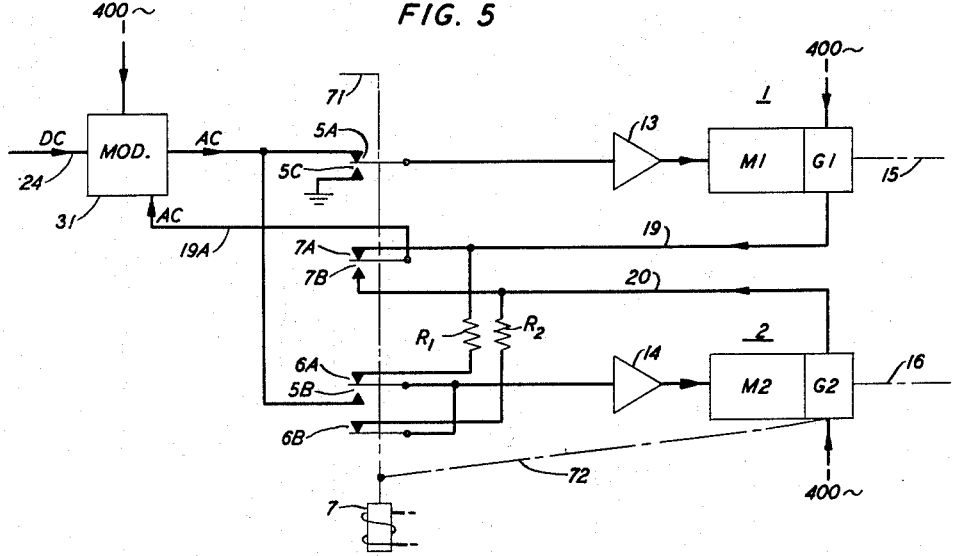

Oct. 29, 1963        D. H. PRUDEN ETAL        3,109,128
                SERVO-MECHANISM CONTROL CIRCUIT
Filed Sept. 19, 1960                    4 Sheets-Sheet 4

INVENTORS  D.H. PRUDEN
           J.W. TIMKO
BY
    Walter M. Hill
            ATTORNEY 3,109,128
SERVO-MECHANISM CONTROL CIRCUIT
David H. Pruden, Whippany, and Joseph W. Timko, Somerville, N.J.; said Pruden assignor to Western Electric Company, Incorporated, a corporation of New York, and said Timko assignor to Bell Telephone Laboratories, Incorporated, New York, N.Y., a corporation of New York
Filed Sept. 19, 1960, Ser. No. 56,854
9 Claims. (Cl. 318—19)

This invention relates to servo-mechanisms and more particularly to a control circuit for such mechanisms.

As servo-mechanisms approach their null position so that the driving torque is comparable in magnitude to the friction load, the operation becomes erratic resulting in an indefinite and irregular approach to the null position. Another source of erratic operation is that, as the servo slows down, the generator output voltage approaches its noise level. Although these conditions are greatly improved by means of the usual feedback circuit, there still remains much to be desired where smooth, jitter-free operation is required, particularly in the case of a slowly shifting null position.

It is an object of this invention to overcome this erratic operation and thereby improve the accuracy and smoothness of the operation of a servo-mechanism as it approaches its null position.

The foregoing object is achieved by this invention by mechanically coupling a second servo-motor to the first one through a speed reducer and a clutch and electrically connecting both of their tachometer generators to the motor drive circuit of the second motor to cause this second motor to run at a higher speed determined by the speed ratio of the speed reducer and the speed of the first motor. The clutch plates are thus caused to turn at equal speeds just prior to clutch engagement. As the first motor approaches its erratic range, the clutch is caused to automatically engage simultaneously with a disconnection of the tachometers from the second motor drive circuit and a transfer of the error voltage from the first motor drive circuit to the second one. The necessary increase in input level to the second motor is provided by also automatically increasing the gain of an amplifier which supplies the error voltage to the motor drive circuit.

The invention may be better understood by reference to the accompanying drawings, in which:

FIG. 2 is a preferred embodiment of the present invention involving the use of two modulators in the motor drive circuit and an alternative form of switching means;

Figure 1:
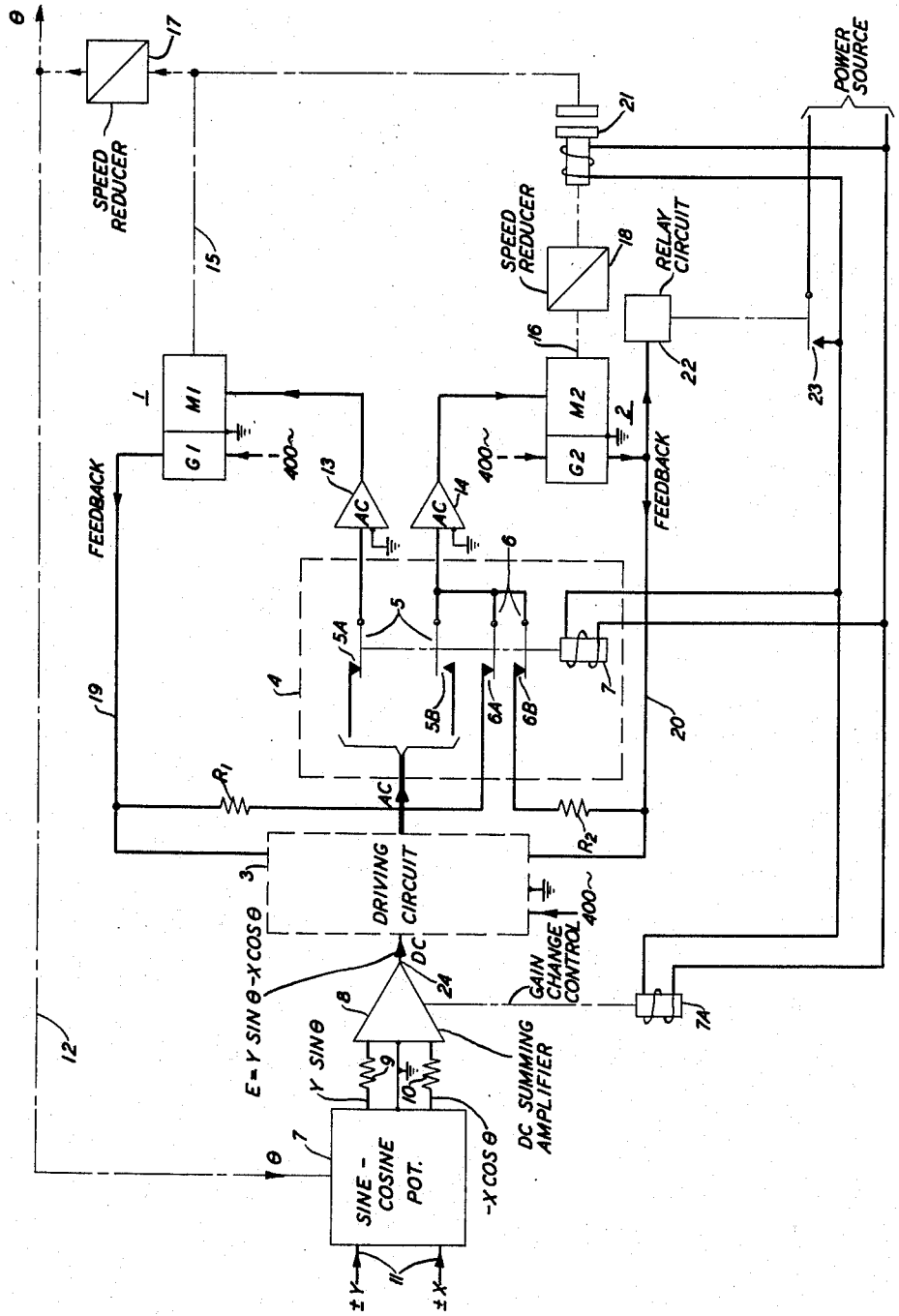
FIG. 1 is a block diagram illustrating the principal parts comprising an embodiment of the present invention.

FIG. 3 discloses circuits for mixing the tachometer feedback into the motor drive circuit of FIGS. 1 and 2; and FIGS. 4, 5, 6 and 7 disclose alternative switching arrangements involving the use of only a single modulator in the motor drive circuit.

FIG. 1 shows two motor-generator units 1 and 2 respectively. In this arrangement, motor-generator unit 1 is assumed to be driving the system towards its null position while the error is large and that, as this error reduces, the angular velocity of this unit gradually approaches its erratic range. Before this range is actually reached, motor-generator unit 2 of this embodiment, which is caused to run at a higher speed, takes over the drive through a speed reducer in a manner to be more particularly described. The higher speed of this motor provides a smooth approach to the null position. Motors M1 and M2 of the motor-generator units are preferably two-phase motors operating at 400 cycles per second. One of the phases of each motor is supplied by 400 cycle per second energy from the excitation source shown connected to its generator. The other phase of the motor is supplied by current from its amplifier. For example, motor M1 is supplied by current from its amplifier 13. Such motors do not operate at speeds in excess of their synchronous speed, thus establishing the upper speed limit. The lower speed limit is determined by the friction and load on the motor. These motors, when running at low speed by reason of a low voltage supplied to one of its phase windings, are very sensitive to load and friction fluctuations and, consequently, their speeds become quite erratic.

For the purpose of illustrating this invention, it is assumed that this servo-mechanism is embodied in an analog computer of conventional type which is intended to solve the equation $$\theta = \tan^{-1}(X/Y) \qquad (1)$$

For this purpose, a conventional sine-cosine potentiometer 7 is supplied with Y and X voltages by way of input circuits 11. The outputs of these potentiometers are made proportional to $Y \sin \theta$ and $-X \cos \theta$. These two functions are added in the direct current summing amplifier 8 through summing resistors 9 and 10, respectively. It is well known that the algebraic sum of these two quantities is zero for only certain unique values of the angle $\theta$ so that if the potentiometer shaft 12 is placed at one of these angular positions, the input to amplifier 8 becomes zero. The direct voltage output of amplifier 8 appearing in circuit 24 is the error voltage which is expressed as $$E = Y \sin \theta - X \cos \theta \qquad (2)$$

As previously mentioned, this error voltage reduces to zero when shaft 12 is in a position such that the angle it represents satisfies Expression 2. In the present embodiment, this voltage is converted into alternating current by the motor driving circuit 3 and transmitted to motor M1 through normally closed contacts 5A and alternating current amplifier 13. The output shaft 15 of motor M1 drives potentiometer shaft 12 through a speed reducer 17 until the error voltage becomes zero. The various voltages mentioned above are taken with reference to ground in accordance with conventional practice. Therefore, the return circuits for the amplifiers, the driving circuit and the motor-generator units are by way of ground as is indicated by their respective ground symbols. These symbols are omitted from the remaining figures in accordance with conventional practice for illustrating circuits by means of block diagrams.

Stabilization around a minor loop in this servo-mechanism is provided by the action of tachometer-generator G1, the output voltage of which is fed back to the driving circuit 3 by way of feedback path 19. Tachometer-generator G1 is provided with 400 cycles per second excitation and is of a well-known type which produces a 400 cycle per second output voltage proportional to the speed of motor M1 which drives it.

Driving circuit 3 is also provided with a 400 cycle voltage and the action of this driving circuit is such as to produce a 400 cycle per second alternating output voltage proportional to the error voltage supplied from amplifier 8 over circuit path 24. Also, as hereinafter more fully explained, the 400 cycle per second feedback voltage from circuit path 19 is mixed with the output voltage from the driving circuit in proper phase to provide stabilization in a manner well understood in this art.

From what has been described with respect to FIG. 1, it will be evident that, so long as potentiometer shaft 12 is at an angle which yields an output error voltage from amplifier 8, motor-generator unit 1 will drive shaft 12 in the proper direction to reduce this error voltage. When the error voltage approaches zero, the motor stops and the position of shaft 12 is intended to give the solution to Expression 1 above. However, as the null position is approached, motor M1 slows down and approaches the above-mentioned erratic range. In accordance with this invention this erratic operation and the resulting error are greatly reduced by transferring the drive from unit 1 to a second motor-generator unit 2 which is caused to operate at a higher speed. In order to effect a smooth transition from the drive from unit 1 to unit 2, it is necessary that the two clutch plates of clutch 21 be turning at the same speed at the instant they engage. To accomplish this, a speed reducer 18 is inserted between the shaft 16 of motor M2 and clutch 21, the speed ratio of which is equal to the ratio of the speeds of motors M2 and M1.

Switch unit 4 contains switching means 5 and 6 which are caused to operate under control of a relay magnet 7. This relay magnet becomes energized when motor M1 approaches its erratic range and the transfer is to be made. Upon operation of this relay, contacts 5A are opened to remove the drive from motor M1 and contacts 5B are closed to transfer the drive to motor M2 through alternating current amplifier 14. In order that motor M2 will be running at the proper speed determined by the speed ratio and the speed of motor M1, a pair of resistors R1 and R2 are used to connect the tachometer voltages from generators G1 and G2, respectively, to the input circuit of motor M2 by way of its amplifier 14.

If the resistance ratio is proportional to the ratio of the desired motor speeds, it can be shown that the two plates of clutch 21 will be running at equal speeds. The resistance ratio meeting this requirement is as follows:

$$R_1/R_2 = S_1/S_2 \qquad (3)$$

where $S_1$ and $S_2$ are the speeds of motors M1 and M2, respectively. The operation of the tachometer-generator circuit to control the speed of motor M2 can be readily understood by noting that the generators G1 and G2 are connected into a conventional type of summing or null circuit by their two resistors $R_1$ and $R_2$ so that when opposite phase voltages from the two generators bear to each other the same ratio as do the resistances of their respective resistors, the voltage applied to the input circuit of amplifier 14 becomes zero. As previously mentioned, these generator voltages are proportional to their motor speeds so this zero input voltage occurs only when the motor speeds are in the ratio defined by Expression 3. Whenever these voltages depart from this ratio, a voltage of the proper phase and magnitude is applied to motor M2, through its amplifier 14, to adjust the speed of motor M2 and correct the ratio.

As both of the contacts 6A and 6B of switch 6 are closed when magnet 7 is de-energized, it will be evident that motor M2 is operating as a slave of motor M1 prior to a transfer of the drive from motor M1 to motor M2. At the instant of switching, the circuit paths through resistors R1 and R2 are both opened so that the error voltage, converted by the driving circuit 3, is now used for driving motor M2. Since motor M2 must run at a higher speed, this voltage must be higher than when used to drive motor M1. This is accomplished by a second relay magnet 7A which operates a gain change control switch in amplifier 8 to cause a step increase in amplifier gain to the proper level.

The simultaneous operation of clutch 21 and relays 7 and 7A is accomplished by a voltage sensitive relay circuit 22 connected to the tachometer output of generator G2. When the voltage lowers to a predetermined point above the critical erratic speed range of motor M1, this relay operates to close contacts 23 and supply power to clutch 21 and the two relay windings. From what has been described it will be evident that a complete transfer of drive is thus effected from motor M1 to motor M2 and, since motor M2 is running at a higher speed, a more precise null position for shaft 12 is reached without the danger of erratic operation.

The operation of the invention may be further illustrated by assuming some particular speed and resistance values. Suppose that identical motors with synchronous speeds of 12,000 r.p.m. are selected for M1 and M2 and that their speeds begin to become erratic in the region of 2,000 r.p.m. The desired relative speed ratio must, therefore, be established and clutch 21 must be caused to engage at speeds above this critical range of 2,000 r.p.m. Suppose that a speed $S_1$ of 3,000 r.p.m. is selected for the speed of motor M1 where the speed ratio control is to become effective and that a speed of 2,500 r.p.m. is selected for the clutch to operate. It should be noted that both of these speeds have been selected to exceed the speed of 2,000 r.p.m. where erratic operation begins. Suppose further that motor M2 is still running at its synchronous speed when motor M1 is lowered to 3,000 r.p.m. Under these assumptions the ratio of $S_2$ to $S_1$ is 4. The speed reducer 18 and the ratio of the resistances $R_2$ to $R_1$ must also have this same ratio. It will be evident that since these motors cannot exceed their synchronous speed, motor M2 will run at a constant speed of 12,000 r.p.m. while motor M1 is running throughout its stable speed range of 12,000 r.p.m. to 3,000 r.p.m. As the speed of motor M1 becomes less than 3,000 r.p.m. motor M2 will be forced to lower its speed as a slave of motor M1, maintaining the speed ratio $S_2/S_1$ at 4 in accordance with Expression 3. This speed ratio is maintained by reason of the previously described controlling action of the tachometer-generators G1 and G2 and their resistance network $R_1$ and $R_2$. Since speed reducer 18 also has the speed ratio of 4, the two plates of clutch 21 will be held at equal speeds for all speeds below 3,000 r.p.m. so that as the speed of 2,500 r.p.m. is reached relay circuit 22 operates to simultaneously engage the clutch 21 and transfer the drive by reason of the operation of relay 7 in response to the closure of contacts 23. Relay circuit 22 is made to operate at 2,500 r.p.m. by simply adjusting it to close its contacts 23 as the voltage output from tachometer-generator G2 lowers to the value corresponding to the speed of 2,500 r.p.m.

The circuits of FIG. 2 are similar to those shown in FIG. 1 except that the driving circuit 3 is specifically disclosed as containing two modulators 31 and 32 for converting the error voltage supplied from circuit 24 to an alternating voltage of suitable frequency for driving the servo-motors, the frequency in this case being selected at 400 cycles per second. Other differences reside in the addition of another amplifier 8A for gain control, an additional speed reducer 18A connected to shaft 15 of unit 1, a specifically different type of speed sensing means for operating contacts 23 and a rearrangement of the switches to be under control of the single relay magnet 7.

Each of the modulators 31, 32 may be of the type disclosed in "Waveforms," vol. 19 of Massachusetts Institute of Technology Radiation Laboratory Series (1949), page 417. The input to the grids of this circuit is connected single ended as indicated in the publication and is supplied by the error voltage from circuit 24 while the 400 cycle per second energy is used as the "Carrier input." For other details with respect to the circuitry involved in this motor driving circuit, reference may be made momentarily to FIG. 3.

In FIG. 3 the portion of the motor driving circuit 3 associated with unit 1 comprises the balanced modulator 31 described in the publication mentioned above, the balanced output of which is connected to a balanced-to-unbalanced amplifier 33 of conventional design. The output of this amplifier is connected to a mixer network comprising resistors R3, R4 and R5. Resistors R3 and R4 may each be of the order of 1/3 megohm while resistor R5 may be in the order of 25,000 ohms. The feedback from tachometer-generator G1 is brought in over feedback path 19 to the junction between resistors R4 and R5 and thereby mixed in opposing phase with the output from amplifier 33 to supply an input for the alternating current amplifier 13.

Instead of amplifier 8 performing both the summing and gain control functions, FIG. 2 shows a second amplifier unit 8A inserted between amplifier 8 and circuit 24. This amplifier is of conventional design and includes a feedback path comprising resistors 82, 83 and 84 which cooperate to control the gain of amplifier 8A in a well-known manner. Normally, resistor 82 is short circuited by switch contacts 81 so as to increase the feedback and lower the gain of amplifier 8A. This is the condition which prevails during the time that motor-generator unit 1 is driving. Although the switching arrangement comprising switching means 5 and 6 of FIG. 1 is differently arranged in FIG. 2, the actual switching functions are identical. In FIG. 2, relay magnet 7 performs all of the switching functions. As before, contacts 5A, 6A and 6B are normally closed. When the transfer is to take place, magnet 7 is energized causing contacts 6A and 6B to open, thereby disconnecting resistors R1 and R2 from the input to amplifier 14. Also, switching contact 5A opens and contacts 5B close, thereby transferring the drive from motor M1 to motor M2. Contacts 5C bring the input to amplifier 13 to zero. The purpose of using two modulators 31 and 32 in this embodiment is to provide a convenient means of supplying the proper phase to motor M2 when switching takes place. It will be understood that the phases from generators G1 and G2 must be opposite in the network R1 and R2 in order to provide the proper speed control operation for motor M2 while motor M1 is driving the shaft. If a transfer of the output from modulator 31 were made directly from motor M1 to motor M2, some provision must be made for reversing the phase. In the present embodiment, where two modulators are used, this phase reversal operation is unnecessary.

Since motor M2 must operate at a higher speed for a given shaft speed of shaft 12, it must receive a higher input voltage when the transfer is made. This is accomplished by opening contacts 81 through the mechanical link 71 from relay magnet 7. These contacts open at the same time that the transfer is made from motor M1 to motor M2. When contacts 81 are open, the additional resistance of resistor 82 reduces the feedback for amplifier 8A and thereby increases its gain. These resistors are proportioned to provide the necessary voltage for motor M2 to drive it at the required transfer speed.

It may be desirable to introduce an additional speed reducer 18A between shaft 15 and speed reducer 17. If this is done, it is obvious that its speed ratio must also be taken into account, along with the ratio of reducer 18, when determining the relative sizes of resistors R1 and R2. The requirement is that the motor speeds be so related that the clutch plates of clutch 21 are running at equal speeds just prior to their engagement.

In order to sense the proper instant for switching, a speed sensitive centrifugal switch 122 operates contacts 23 rather than the electrical circuit mentioned for FIG. 1. As such switches are conventional, further description thereof is unecessary.

The remainder of the circuit disclosed in FIG. 2 bears reference numerals corresponding with those in FIG. 1 and the description of FIG. 1 with respect to these elements applies equally here.

FIG. 4 is a fragmentary circuit diagram showing a modification of the switching arrangement of FIG. 2 adapting the circuit for the use of a single modulator. In this case, modulator 31 is used for alternately driving motor M1 and motor M2, depending upon the energization of relay magnet 7. In the unenergized position, motor M1 is driving the shaft by reason of receiving alternating current energy from modulator 31 through normally closed contacts 5A. At the same time, the input circuit of motor M2 is being supplied with energy from both feedback circuits 19 and 20 through resistors R1 and R2 and normally closed switch contacts 6A and 6B. In order to use a single modulator, it is necessary that the feedback energy supplied to the mixer circuit be also transferred from one generator to the other. Thus, while motor M1 is driving, the feedback circuit 19 from generator G1 is connected to modulator 31 through normally closed contact 7A and circuit 19A. Upon energization of relay magnet 7, contacts 5A open and the input circuit of amplifier 13 is grounded at contacts 5C. At the same time, contacts 5B close to transfer the output from modulator 31 to motor M2 through its amplifier 14. The necessary phase reversal from generator G2 is provided by a phase inverter 41 connected between feedback circuit 20 and contacts 7B. As coil 7 is energized, circuit 19A is transferred from feedback circuit 19 to feedback circuit 20 by reason of the opening of contacts 7A and the closing of contacts 7B. The rest of this circuit operation is identical to that described for the previous figures.

Except for the manner by which the phase from generator G2 is reversed when switching takes place, the circuits of FIG. 5 are identical with those shown in FIG. 4. In this embodiment, the phase inverter 41 is replaced by a conventional switching mechanism in generator G2 actuated by a mechanical link 72 from relay 7. This switch in generator G2 may either reverse the connections of the 400 cycle per second excitation energy supplied to generator G2 or reverse the connections from generator G2 to feedback circuit 20. The effect of these reversals in connection is merely to reverse the phase of the energy supplied to circuit 20 upon switching.

Figure 6:
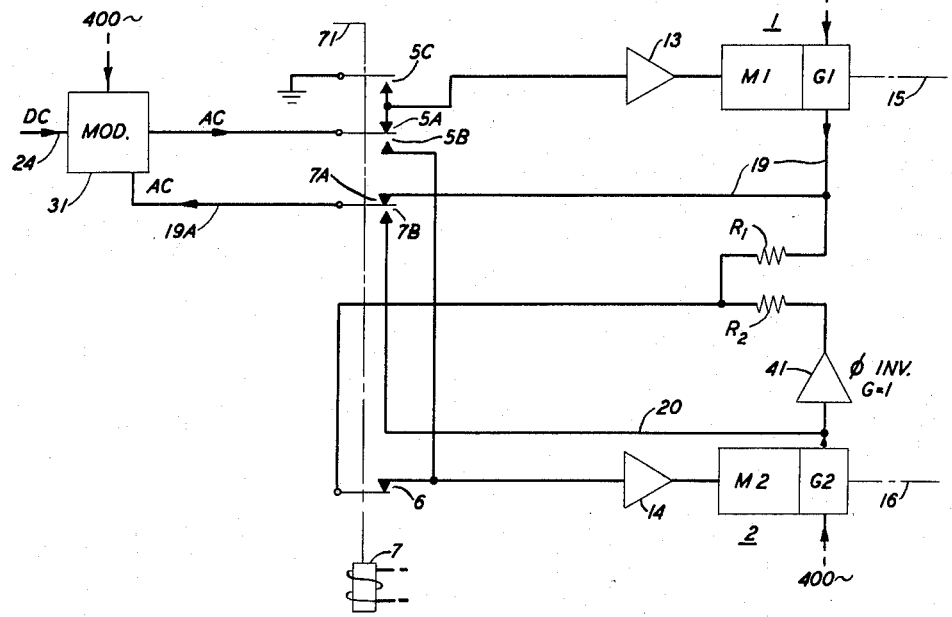

FIG. 6 shows another alternative switching arrangement which provides the same functions as the previous figures but with a simpler switching arrangement made possible by reason of having resistors R1 and R2 permanently connected in series between the generators. As these resistors are relatively large, they provide no appreciable loading on the generators. In this figure, phase inverter 41 is connected between generator G2 and resistor R2 and the junction between these two resistors is brought to the input circuit of amplifier 14 through normally closed contacts 6. Contacts 6 provide the same function as contacts 6A and 6B performed in the previous figures. The reference numerals attached to the remaining elements in this figure correspond to those having identical functions in the preceding figures.

Figure 7:
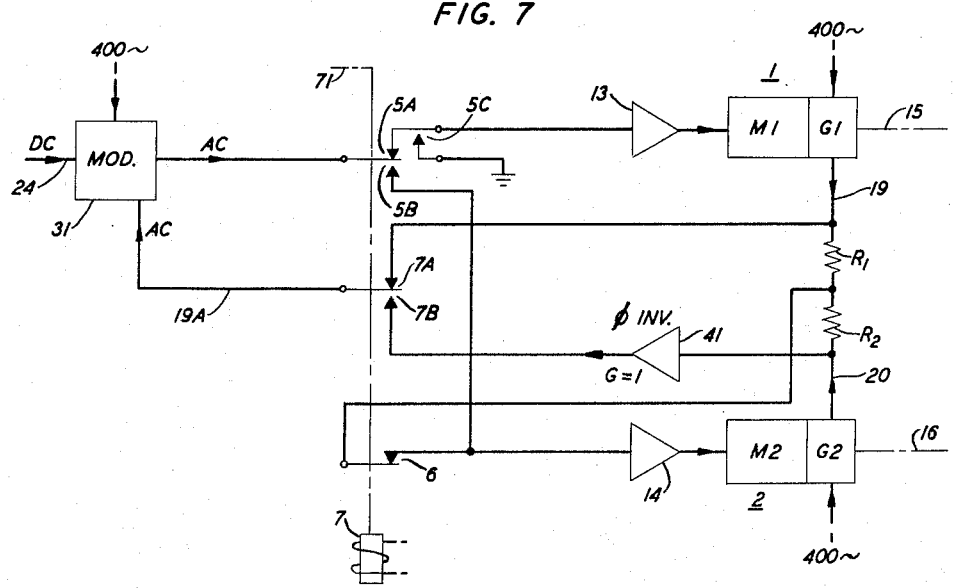

FIG. 7 shows a further modification of the switching circuit involving the use of another conventional type of relay switch mechanism. In this figure, the phase inverter 41 is connected between generator G2 and normally opens contacts 7B. It will be perfectly evident from the descriptions of the preceding figures that the operation of this circuit is otherwise the same.

It will be evident to those skilled in the art that many other switching arrangements may be devised for performing the same functions. Also, the necessary phase reversal may be effected by other means such as transformers and other well-known mixers and modulators may be substituted without departing from the scope of the invention.

What is claimed is:

1. A servo-mechanism control circuit comprising first and second motor-generator units, a driving circuit for said motors producing an output voltage determined by an error voltage supplied thereto, a feedback loop for stabilizing each unit, a first switching means normally connecting said driving circuit to only one of said motors and, upon operation of said means, to connect said driving circuit to only the other motor, output shafts for said units, a speed reduction means and a clutch interconnecting said output shafts, a second switching means normally connecting each generator to said other motor through paths including impedance means and, upon operation of said second switching means, to open said paths, and a speed responsive control means for simultaneously engaging said clutch and operating both switching means.

2. The combination of claim 1 wherein said impedance means comprises a pair of resistors, one in said path from each generator to said other motor, the ratio of the resistances of said resistors being substantially equal to the ratio of the output shaft speeds of their respective motor-generator units.

3. The combination of claim 1 wherein said driving circuit comprises at least one modulator having one input circuit for receiving said error voltage, a second input circuit for receiving an alternating voltage of frequency suitable for driving said motors, an output circuit in which is produced an alternating voltage of said frequency and of amplitude substantially proportional to said error voltage, and means for mixing in opposite phase the output from said modulator output circuit and a voltage from said feedback loop.

4. The combination of claim 1 and an amplifier for supplying the error voltage to said driving circuit, said amplifier including a gain control means for changing its gain by a predetermined amount, and means included with said speed responsive control means for also operating said gain control means simultaneously with the engagement of said clutch.

5. A servo-mechanism control circuit comprising first and second motor-generator units, a driving circuit for said motors having an error voltage input cicuit and means for converting an error voltage impressed thereon to an alternating voltage proportional to said error voltage and of frequency suitable for driving said motors, a feedback loop connecting each generator to said driving circuit for stabilizing said units, a first switching means normally connecting said driving circuit to only one of said motors, and upon operation of said switching means, to connecting said driving circuit to only the other motor, output shafts for said units, a speed reduction means and a clutch interconnecting said output shafts, a second switching means normally connecting each generator to said other motor through paths including impedance means and, upon operation of said second switching means, to open said paths, and a speed responsive control means for simultaneously engaging said clutch and operating both switching means.

6. The combination of claim 5 wherein said impedance means comprises a pair of resistors, one in said path from each generator to said other motor, the ratio of the resistances of said resistors being substantially equal to the ratio of the output shaft speeds of their respective motor-generator units.

7. The combination of claim 5 wherein said driving circuit comprises at least one modulator having one input circuit for receiving said error voltage, a second input circuit for receiving an alternating voltage of frequency suitable fo driving said motors, an output circuit in which is produced an alternating voltage of said frequency and of amplitude substantially proportional to said error voltage, and means for mixing in opposite phase the output from said modulator output circuit and a voltage from said feedback loop.

8. The combination of claim 5 and an amplifier for supplying the error voltage to said driving circuit, said amplifier including a gain control means for changing its gain by a predetermined amount, and means included with said speed responsive control means for also operating said gain control means simultaneously with the engagement of said clutch.

9. In a tachometer-generator feedback stabilized servomechanism of the type wherein an error voltage is derived as a function of at least one input signal voltage and the angular position of a motor driven shaft, said error voltage being used to drive the motor until its shaft reaches a null position where the error voltage is reduced to substantially zero, means for increasing the smoothness and precision with which the shaft of said mechanism approximates its true null position, said means comprising in combination a second motor having an input circuit, a shaft and a tachometer-generator for feedback stabilization, means coupling said two shafts through a speed reducer and a clutch having opposed clutch plates, means including a pair of resistors connecting said two generators to the input circuit of said second motor through a normally closed switching means whereby the speed of said second motor is under control of the speed of said first motor and the clutch plates are brought to substantially equal speeds as said first shaft nears its null position, a second switching means for transferring the error voltage from said first motor to said second motor and a speed responsive means for simultaneously engaging said clutch and operating both of said switching means as said null position is approached.

References Cited in the file of this patent
UNITED STATES PATENTS

| | | |
|---|---|---|
| 2,511,863 | McCoy | June 20, 1950 |
| 2,751,535 | Kuhnel | June 19, 1956 |
| 2,764,720 | Kelling | Sept. 25, 1956 |
| 2,798,992 | Adler et al. | July 9, 1957 |
| 2,872,112 | Greenwood | Feb. 3, 1959 |

FOREIGN PATENTS

| | | |
|---|---|---|
| 707,138 | Great Britain | Apr. 14, 1954 |